US009646026B2

(12) United States Patent
Glachant et al.

(10) Patent No.: US 9,646,026 B2
(45) Date of Patent: *May 9, 2017

(54) DETERMINING POINTS OF INTEREST USING INTELLIGENT AGENTS AND SEMANTIC DATA

(71) Applicant: INTERNATIONAL BUSINESS MACHINES CORPORATION, Armonk, NY (US)

(72) Inventors: Mathieu J. R. Glachant, Boonton, NJ (US); Alvin Jenkins, Ocean City, MD (US); Sri Ramanathan, Lutz, FL (US); Matthew A. Terry, Celebration, FL (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,556

(22) Filed: May 21, 2015

(65) Prior Publication Data
US 2015/0254278 A1  Sep. 10, 2015

Related U.S. Application Data

(63) Continuation of application No. 14/013,459, filed on Aug. 29, 2013, now Pat. No. 9,107,037, which is a
(Continued)

(51) Int. Cl.
*G06F 17/30* (2006.01)
*H04W 4/02* (2009.01)

(52) U.S. Cl.
CPC .. *G06F 17/30241* (2013.01); *G06F 17/30684* (2013.01); *H04W 4/02* (2013.01)

(58) Field of Classification Search
CPC ........... G06F 17/30241; G06F 17/3028; G06F 17/3087; G06F 17/30265; G06F 17/30247;
(Continued)

(56) References Cited

U.S. PATENT DOCUMENTS

| 6,085,204 A | 7/2000 | Chijiwa et al. |
| 7,933,001 B2 * | 4/2011 | Otani ...................... G01C 3/00 356/3 |

(Continued)

OTHER PUBLICATIONS

Golbeck et al., "Organization and Structure of Information using Semantic Web Technologies", Handbook of Human Factors in Web Design, 2003, URL: http://www.mindswap.org/papers/handbook.pdf.
(Continued)

*Primary Examiner* — Dennis Truong
(74) *Attorney, Agent, or Firm* — Christopher K. McLane; Andrew M. Calderon; Roberts Mlotkowski Safran, Cole & Calderon, P.C.

(57) ABSTRACT

A method, a system, and a computer program product are provided for determining points of interest using intelligent agents and semantic data. The method is implemented in a computer infrastructure having computer executable code tangibly embodied on a computer readable storage medium having programming instructions operable for receiving a media data comprising a location data comprising where media was captured. The instructions are also operable for determining at least one point of interest based on the media data, tying the media data to the at least one point of interest, and providing the media data tied to the at least one point of interest to an end user.

16 Claims, 10 Drawing Sheets

Related U.S. Application Data continuation of application No. 12/954,298, filed on Nov. 24, 2010, now Pat. No. 8,543,586.

(58) Field of Classification Search
CPC .... G01S 19/42; G06K 2209/27; G06K 9/00664; G06K 9/4671; H04N 2201/3253; G01C 21/3679
USPC ............... 707/707, 736, 75, 722; 455/456.1
See application file for complete search history.

(56) References Cited

U.S. PATENT DOCUMENTS

| | | | |
|---|---|---|---|
| 2001/0015756 A1* | 8/2001 | Wilcock | G06F 17/30265 348/158 |
| 2004/0236739 A1 | 11/2004 | Nevill-Manning | |
| 2006/0229807 A1 | 10/2006 | Sheha et al. | |
| 2007/0010924 A1* | 1/2007 | Otani | G01C 11/30 701/33.4 |
| 2007/0115373 A1 | 5/2007 | Gallagher et al. | |
| 2007/0173956 A1 | 7/2007 | Koch et al. | |
| 2007/0288197 A1* | 12/2007 | Martin | G01C 15/008 702/152 |
| 2008/0204317 A1 | 8/2008 | Schreve et al. | |
| 2008/0255758 A1 | 10/2008 | Graham et al. | |
| 2008/0267506 A1 | 10/2008 | Winder | |
| 2008/0268876 A1 | 10/2008 | Gelfand et al. | |
| 2009/0005987 A1 | 1/2009 | Vengroff et al. | |
| 2009/0063419 A1 | 3/2009 | Nurminen et al. | |
| 2009/0092277 A1 | 4/2009 | Ofek et al. | |
| 2009/0110302 A1* | 4/2009 | Snow | G06T 17/05 382/225 |
| 2009/0222432 A1* | 9/2009 | Ratnakar | G06F 17/30265 |
| 2009/0293295 A1* | 12/2009 | Hirobe | G01C 17/28 33/356 |
| 2009/0315995 A1 | 12/2009 | Khosravy et al. | |
| 2010/0009700 A1 | 1/2010 | Camp, Jr. et al. | |
| 2010/0057694 A1 | 3/2010 | Kunjithapatham et al. | |
| 2011/0044563 A1 | 2/2011 | Blose et al. | |
| 2011/0052073 A1 | 3/2011 | Wallace et al. | |
| 2011/0276556 A1 | 11/2011 | Meier et al. | |
| 2012/0150871 A1 | 6/2012 | Hua et al. | |

OTHER PUBLICATIONS

Razmerita et al., "New Generation of . . . Social Data Portability", Workshop on Adaptation and Personalization for Web 2.0, UMAP'09, Jun. 22-26, 2009, pp. 79-87.

Lewis et al., "Intelligent agents and the Semantic Web", Oct. 21, 2008, URL: http://www.ibm.com/developerworks/web/library/wa-intelligentage/, Downloaded Jun. 8, 201 O (13 pages).

Hung et al., "Intelligent Agent Communication . . . Ontology", World Academy of Science, Engineering and Technology Jun. 2005, pp. 106-109.

Lee et al., "Semantic Association-Based Search . . . Web Portal", International Journal of Computer Networks & Communications, vol. 2, No. 1, Jan. 2010, pp. 140-152.

Gilbertson, "Embed Videos in your Web Pages Using HTML5", URL: http://www.webmonkey.com/2010/05/embed- videos-in-your-eb-using-html5, Downloaded Jun. 8, 2010, 18 pages.

* cited by examiner

DETERMINING POINTS OF INTEREST USING INTELLIGENT AGENTS AND SEMANTIC DATA

TECHNICAL FIELD

The present invention generally relates to a method, a system, and a computer program product for determining points of interest, and more particularly, to a method, a system, and a computer program product for determining points of interest using intelligent agents and semantic data.

BACKGROUND

The availability of Global Position System (GPS) functionality in devices has expanded, along with cellular networks' ability to quickly determine the location of these devices. As a result, the latest devices are embracing the addition of location awareness in their functionality. An example of this advancement is in smartphones that incorporate location awareness in many facets of their device functionality.

For example, smartphones may incorporate location awareness in their map functions. Specifically, a smartphone user can view a map based on his or her determined location, the map including the area that the user is walking in and/or an indicator (e.g., a pinpoint) on the map where he or she is located. In another example, smartphones may incorporate location awareness to recommend restaurants to users. For instance, after a user requests a smartphone for a restaurant recommendation, the smartphone may receive from a cellular network its location. The smartphone may then find and recommend restaurants based on the received location instead of simply on food genre, price, and/or reviewer ratings.

Accordingly, incorporating location awareness into device functionality may provide various advantages to users. In the previous example of a smartphone recommending restaurants, location awareness may allow users to conveniently receive information regarding nearby eateries instead of solely receiving a list of distant ones. However, while location awareness has been successfully incorporated into several device functions for user benefit, there is a need for methods and systems to incorporate location awareness into other device functions.

SUMMARY

In a first aspect of the invention, a method is implemented in a computer infrastructure having computer executable code tangibly embodied on a computer readable storage medium having programming instructions operable for receiving a media data including a location data including where media was captured. The instructions are also operable for determining at least one point of interest based on the media data, tying the media data to the at least one point of interest, and providing the media data tied to the at least one point of interest to an end user.

In another aspect of the invention, system implemented in hardware includes a media agent configured to receive a media data including a location data of where media was captured. The system also includes an arbiter module configured to receive the media data from the media agent, determine at least one point of interest based on the media data, tie the media data to the at least one point of interest, and receive from an end user a request for the media related to the at least one point of interest. The arbiter module is further configured to provide the user at least one of another media and another media data tied to the at least one point of interest.

In an additional aspect of the invention, a computer program product includes a computer usable storage medium having readable program code embodied in the storage medium. The computer program product also includes at least one component operable to receive a media data including a location data including where media was captured, determine at least one point of interest based on the media data, and tie the media data to the at least one point of interest. The at least one component is further operable to determine a file based on the media data tied to the at least one point of interest, and provide the file for at least one of a presentation to an end user, tagging the media, and storage.

In yet another aspect of the invention, a method of deploying a system for identifying at least one point of interest includes providing a computer infrastructure, being operable to receive a media data including a location data including where media was captured, and determine the at least one point of interest based on the media data. The computer infrastructure is further operable to tie the media data to the at least one point of interest, and provide the media data tied to the at least one point of interest to an end user.

In a further aspect of the invention, a computer system for determining points of interest, the system includes a CPU, a computer readable memory and a computer readable storage media. The computer system also includes first program instructions to receive a media data including a location data of where media was captured and a direction data including a direction a device was pointing at to capture the media, and second program instructions to determine at least one point of interest based on the media data. Third program instructions tie the media data to the at least one point of interest, and fourth program instructions provide the media data tied to the at least one point of interest to an end user. The first, second, and third program instructions are stored on the computer readable storage media for execution by the CPU via the computer readable memory. The second program instructions are further configured to determine an azimuth-based center of the media based on an intersection of the direction data, determine a geographic center of the media based on an average midpoint of the location data, and determine semantic data based on the media data. At least one current point of interest is determined based on the media data, and the at least one point of interest is determined based on the azimuth-based center, the geographic center, the semantic data, and the at least one current point of interest.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
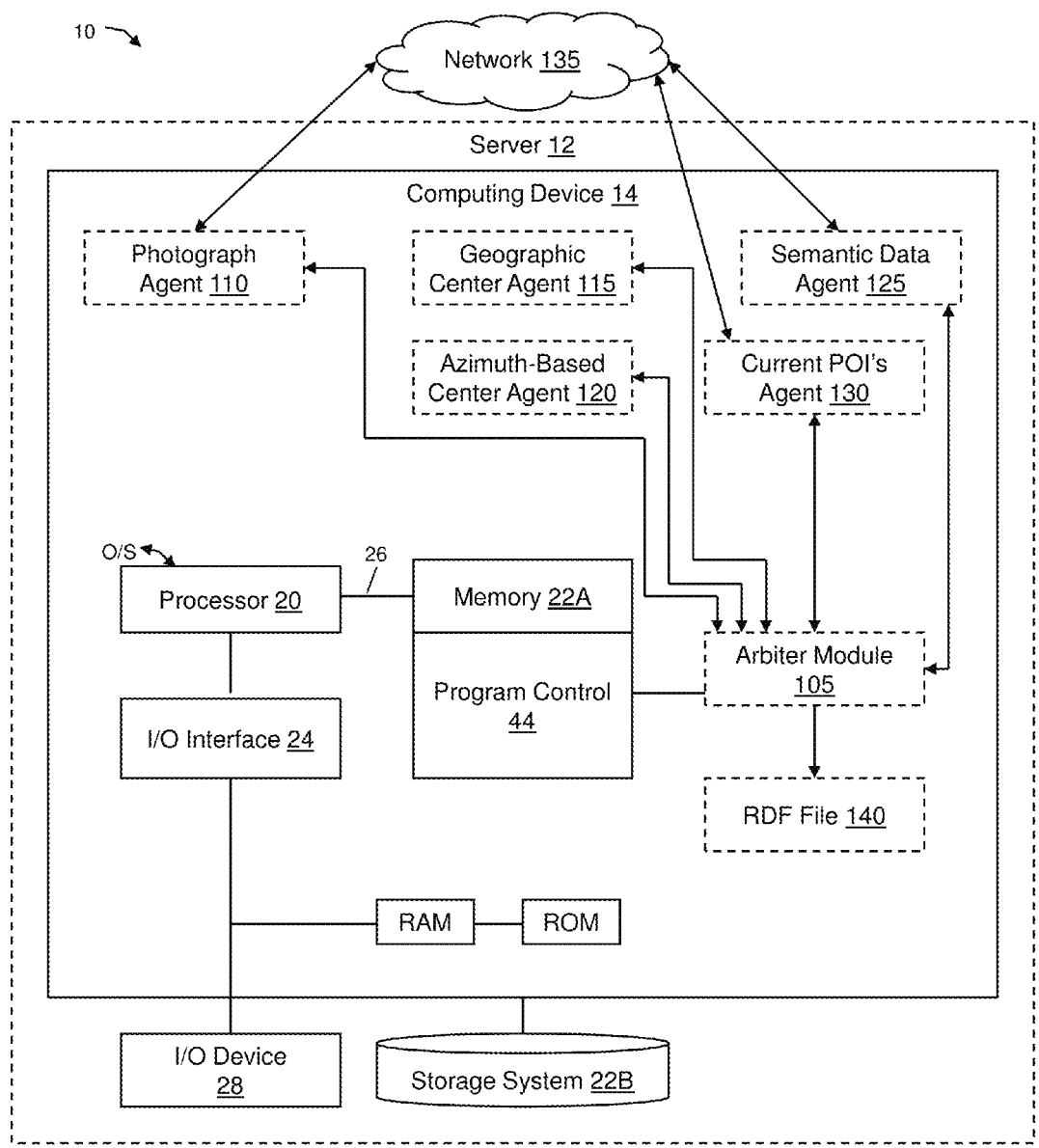
FIG. 1 is an illustrative environment for implementing the steps in accordance with aspects of the invention.

The present invention generally relates to a method, a system, and a computer program product for determining points of interest, and more particularly, to a method, a system, and a computer program product for determining points of interest using intelligent agents and semantic data. More specifically, the invention is directed to systematically identifying points of interest using shared media tagged with geographical identification metadata (i.e., geotagged media), and automatically tying this media to the identified points of interests. In implementation, the invention uses various processes to mathematically identify significant clusters of media. In embodiments, once a cluster is identified, a cluster pattern and/or a direction each device was pointing to capture media may be taken into account in processes used to identify points of interest routinely captured. In further embodiments, once a point of interest is systematically identified as a specific pinpoint on a map, location information of the pinpoint (e.g., longitude and latitude) can be correlated with existing points-of-interest maps to retrieve related information such as the name and/or the description (i.e., semantic data) of the identified point of interest.

In embodiments, the present invention can utilize the retrieved semantic data and/or additional semantic data to make inferences about geotagged media shared during a window of time, one of these inferences being points of interest related to the media. For example, using semantic data, the system can determine a relevance of pictures around a point of interest, and can infer that a picture or group of pictures may be related to an event, a time, and a point of interest based on the picture location(s). Although the examples described herein refer primarily to photographs, other types of media or data are contemplated by the invention, including for example, video, crime data, and event data.

By implementing the present invention, media may be systematically grouped and/or tagged by identified points of interest and related semantic data, which currently requires significant human intervention to manually tag media. In addition, users can conveniently review and update the points of interest and the related semantic data identified by the system. For example, in operation, a user can point a device at a point of interest, capture the point of interest as media, and share the media by, for instance, uploading the media via a network to the system. The system then instantly matches the shared media to an existing cluster of media and can identify the point of interest related to the media. Once the point of interest is identified, advantageously, a user can query the system for media including the point of interest that already exist and receive from the system a list of such media. For instance, the list of media may include images of the point of interest from different vantage points, such as an image of a body of water from standing on land and an image of the same body of water from the body of water itself. As mentioned above, a user can also receive from the system semantic data related to the identified points of interest. Further, law enforcement or emergency services can query the system for media of a certain occurrence using a specified location within a particular time window.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an arbiter module 105, e.g., the processes described herein. The arbiter module 105 can be implemented as one or more program code in the program control 44 stored in memory 22A as separate or combined modules. Additionally, the arbiter module 105 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention, such as, for example, determining points of interest based on intelligent agents and/or semantic data. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments of the present invention, the arbiter module 105 may be in communication with a photograph agent 110, a geographic center agent 115, an azimuth-based center agent 120, a semantic data agent 125, and a current points-of-interest (POI's) agent 130. The photograph agent 110, the geographic center agent 115, the azimuth-based center agent 120, the semantic data agent 125, and the current POI's agent 130 may each be located within the server 12 or outside the server 12 in, for example, a network 135. In the latter embodiment, the agents 110, 115, 120, 125, and 130 may be implemented in third-party servers and provide their functionalities as third-party services. Alternatively, each of the agents 110, 115, 120, 125, and 130 may be implemented as one or more program code in the program control 44 stored in memory 22A as separate or combined modules. Additionally, the agents 110, 115, 120, 125, and 130 may be implemented as separate dedicated processors or a single or several processors to provide the function of these agents.

In embodiments, the arbiter module 105 may receive various data from the photograph agent 110, the geographic center agent 115, the azimuth-based center agent 120, the semantic data agent 125, and the current POI's agent 130. More specifically, the arbiter module 105 may receive photograph data from the photograph agent 110, which interfaces with a user via, for instance, the network 135. The process of producing photograph data begins when a user's device (e.g., a digital camera) captures a photograph of a possible point of interest. In another example, a user's smartphone may include an advanced, integrated digital camera, with resolution as high as 8 megapixel, that can capture a photograph of a possible point of interest. Along with a high-powered camera, a smartphone may further include Internet capabilities that allow a user to quickly and conveniently upload photographs via the Internet to, for instance, the photograph agent 110, and to share them with his or her social networks, for example.

In addition to capturing and uploading high resolution pictures, a user device may tag these pictures with location data (i.e., geotagging) based on where the device is located when the pictures are taken. In some cases, a user device may also tag each image with direction data including a direction a device was facing when the image was captured. The location data and/or the direction data may be available for viewing along with the images on many picture sharing websites. The photograph may further be tagged with metadata such as a time and date when the photograph is taken. All of these tags or data can constitute the photograph data. The user uploads or sends the photograph data to the photograph agent 110, which may further process and/or store the photograph data. The arbiter module 105 may forward the photograph data to the agents 115, 120, 125, and 130 for further processing of the photograph data, as described herein.

In further embodiments, the arbiter module 105 may receive a geographic center of a cluster of photographs from the geographic center agent 115. The geographic center is a location of a center of a cluster of photographs, and may include a longitude value and a latitude value. The geographic center agent 115 may receive photograph data from the photo agent 110 and/or via the arbiter module 105 and determine the geographic center of a cluster of photographs based on the received photograph data and/or stored photograph data. Further, the geographic center agent 115 determines the geographic center using maps including location data of photograph data plotted on the maps, as will be discussed more in detail with respect to FIGS. 2A-2E below. These maps may be uploaded to the geographic center agent 115 from, for example, the network 135.

In even further embodiments, the arbiter module 105 may receive an azimuth-based center of a cluster of photographs from the azimuth-based center agent 120. The azimuth-based center is a location of a center of a cluster of photographs and may include a longitude value and a latitude value. Like the geographic center agent 115, the azimuth-based center agent 120 may receive photograph data from the photo agent 110 and/or via the arbiter module 105 and determine the azimuth-based center of a cluster of photographs based on the received photograph data and/or stored photograph data. The azimuth-based center agent 120 may also determine the azimuth-based center using maps including location data of photograph data plotted on the maps. In contrast to the geographic center agent 115, the azimuth-based center agent 120 additionally utilizes photograph data including directional data to determine the azimuth-based center, as will be discussed more in detail with respect to FIG. 3 below. The directional data includes a direction that a user device is pointed at in order to capture a photograph, and may include, for example, a degree value with respect to the north (N) direction. The directional data may be captured by a user device equipped with a magnetometer, for instance.

In embodiments, the arbiter module 105 may receive semantic data from the semantic data agent 125. Semantic data may include, for example, a name and a description of a location and/or a point of interest. Additionally, semantic data may include an event, a time of the event, and/or a date of the event at a location and/or a point of interest. The semantic data agent 125 may receive the semantic data from various sources (e.g., users and services) via the network 135. The semantic data agent 125 may also receive photograph data from the arbiter module 105 and determine which semantic data to return to the arbiter module 105 based on the received photograph data. For example, the semantic data agent 125 may return event descriptions near locations of the geotagged photograph data.

In further embodiments, the arbiter module 105 may receive current POI's from the current POI's agent 130. The current POI's may include maps including locations, names, and/or descriptions of the current POI's. The current POI's agent 130 may receive the current POI's from various sources via the network 135. The current POI's agent 130 may further receive photograph data from the arbiter module 105 and determine which current POI's to return to the arbiter module 105 based on the received photograph data. For instance, the current POI's agent 130 may return current POI's and related information nearby locations of the geotagged photograph data.

In embodiments, the arbiter module 105 may use the data received from the agents 110, 115, 120, 125, and 130 to identify points of interest related to the received photograph data. For example, the arbiter module 105 can use the current POI's from the current POI's agent 130 to determine if any of the location data in the photograph data from the photo agent 110 are around the locations of the current POI's. This can be accomplished by using the geographic center or the azimuth-based center of a cluster of photographs from the agents 115 and 120, respectively. The arbiter module 105 can plot a circle, or any other predetermined area, around the geographic center or the azimuth-based center to determine if any of the current POI's fall within the circle or the other predetermined area. Alternatively, the arbiter module 105 can identify points of interest without utilizing the geographic center or the azimuth-based center, by determining, for example, whether any current POI's lie within a circle of a specified radius from a photograph location. The arbiter module 105 can also search location data and/or semantic data of the current POI's to determine if any of this data matches with the metadata of the photograph data.

In embodiments, after identifying points of interests using these exemplary processes, the arbiter module 105 may consider these points of interests as a set of possible points of interest related to the photograph data. The arbiter module 105 may then determine a level of confidence for each possible point of interest. For instance, the arbiter module 105 may determine a high level of confidence that a point of interest of the photograph is the Monument A, if the location of the photograph is the same as the location of the Monument A. If the level of confidence of a possible point of interest is greater than a or equal to a predetermined threshold, then the arbiter module 105 may designate the possible point of interest as the actual point of interest related to the photograph data, and may tie the photograph data with the actual point of interest and any related semantic data.

In further embodiments, the arbiter module 105 may use the semantic data from the semantic data agent 125 and the current POI's agent 130 to make inferences about the location of the photograph data and/or an identified point of interest. In other words, the arbiter module 105 can inferentially tie the semantic data to the location of the photograph data and/or the identified point of interest. For example, once the arbiter module 105 identifies the Monument A as a point of interest in a photograph, the arbiter module 105 can infer that semantic data including event information (e.g., the Fourth of July fireworks) is also related to the photograph. The arbiter module 105 may determine a level of confidence for these inferences based on the relationship between the semantic data and the photograph data. For instance, the arbiter module 105 may determine a high level of confidence in the inference of the photograph being related to the Fourth of July fireworks if the photograph data matches the date and the time of the fireworks. If the level of confidence of a possible inference is greater than or equal to a predetermined threshold, then the arbiter module 105 may tie the photograph data with the inference. Inferences can be utilized to strengthen levels of confidence in other inferences and in possible points of interest.

In embodiments, the arbiter module 105 may place the photograph data, the identified points of interests, its related semantic data, and the inferences in a file 140 written in, for example, a Resource Description Framework (RDF) metadata data model format. The following is a non-limiting, illustrative example of the RDF file 140:

```
<rdf:RDF>
    <geo:Point>
        <geo:lat>48.17913602972129</geo:lat>
        <geo:long>16.32122039794922</geo:long>
    </geo:Point>
    <location:Description>
        <location:short>Monument A</location:short>
        <location:long>
    </location:description>
    <event:description>
        <event:short>Fourth of July</event:short>
        <event:long></event:long>
            <event:calander>
                <event:date>07/04/2009</event:date>
                <event:start>20:00</event:start>
                <event:end>23:59</event:end>
            </event:calander>
        <event:description>
</rdf:RDF>
```

The RDF file 140 shown above includes a geographical location of a point of interest. The RDF file 140 also includes semantic data associated with the point of interest including a location description of the point of interest and a description of an event at the point of interest. The description of the event at the point of interest includes a short description of the event, a date of the event, and a time duration of the event.

In further embodiments, the arbiter module 105 may provide the RDF file 140 related to photographs to a user for review and/or update via, for example, the network 135 and an application interface. Also, the arbiter module 105 may use the RDF file 140 to tag photograph data with additional metadata include point-of-interest information. Alternatively, the arbiter module 105 may send the RDF file 140 to a processing agent within or outside the server 12, where the processing agent tags photographs with the RDF file 140 and/or uses the RDF file 140 in further processes. Advantageously, photographs may be systematically grouped and/or tagged by identified points of interest and related semantic data, which typically requires significant human intervention to manually tag photographs. Furthermore, users with RDF files from the system and/or photographs tagged with data from the RDF files can conveniently review and update the points of interest of photographs and the related semantic data identified by the system.

In another example, a user may request the photograph agent 110 and/or the arbiter module 105 for photographs of a point of interest on a specific date (e.g., the Monument A on the Fourth of July). The arbiter module 105 may search RDF files stored in the system to retrieve a RDF file including semantic data with the point of interest on the specific date. The arbiter module 105 may then read a location from the retrieved RDF file and search for photographs within the location stored locally or externally. Additionally, the arbiter module 105 may send location data of the photographs to the azimuth-based center agent 120 to eliminate possible outliers. More particularly, the azimuth-based center agent 120 may remove locations of the photographs that point in a direction away from the desired point of interest or mark such locations as low priority in the set of photographs. Advantageously, a user can query the system for media of the point of interest that already exist and receive from the system the requested media and/or a list of such media.

Figure 2A:
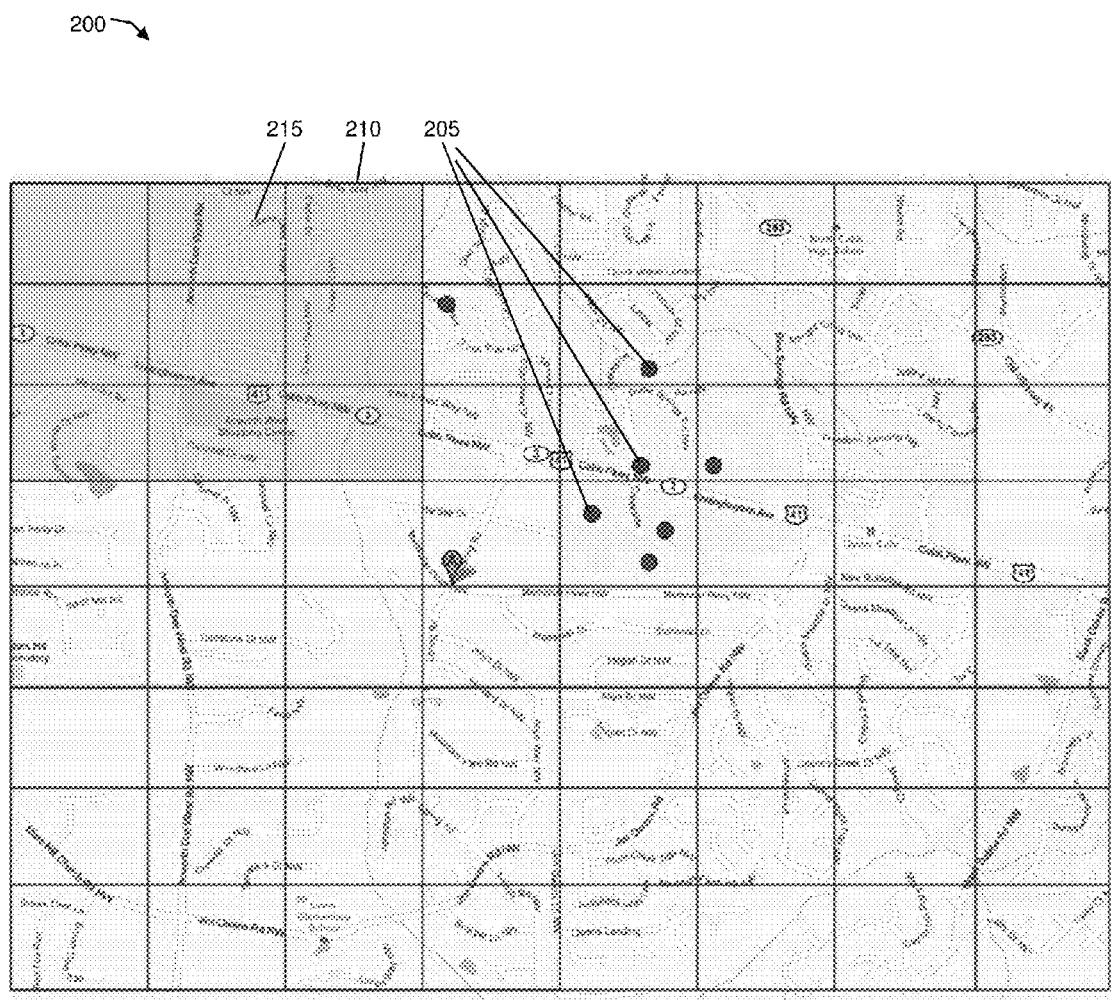
FIG. 2A is an exemplary map used to determine a geographic center of a cluster of photographs in accordance with aspects of the invention.

FIG. 2A shows an exemplary map 200 used by the geographic center agent 115 to determine a geographic center of a cluster of photographs 205. Before the geographic center agent 115 can determine the geographic center, the agent 115 finds a cluster of photographs 205, or multiple locations of user photographs that congregate to possibly make up a point of interest. To search for the cluster, the agent 115 places photograph data including locations of the photographs 205 on the map 200, as datapoints or pinpoints. The agent 115 also places a grid 210 on the map 200. The agent 115 then places a two-dimensional array 215 onto the map 200, the array 215 being a predetermined portion of the grid 210. In this case, the array 215 is 3 units by 3 units of the grid 210 in size, though other sizes are contemplated by the present invention. Next, the agent 115 scans the array 215 to determine if at least a predetermined number of photographs or datapoints were taken within the array 215 to constitute a cluster of photographs. In this case, there are no photographs or datapoints taken within the array 215.

Figure 2B:
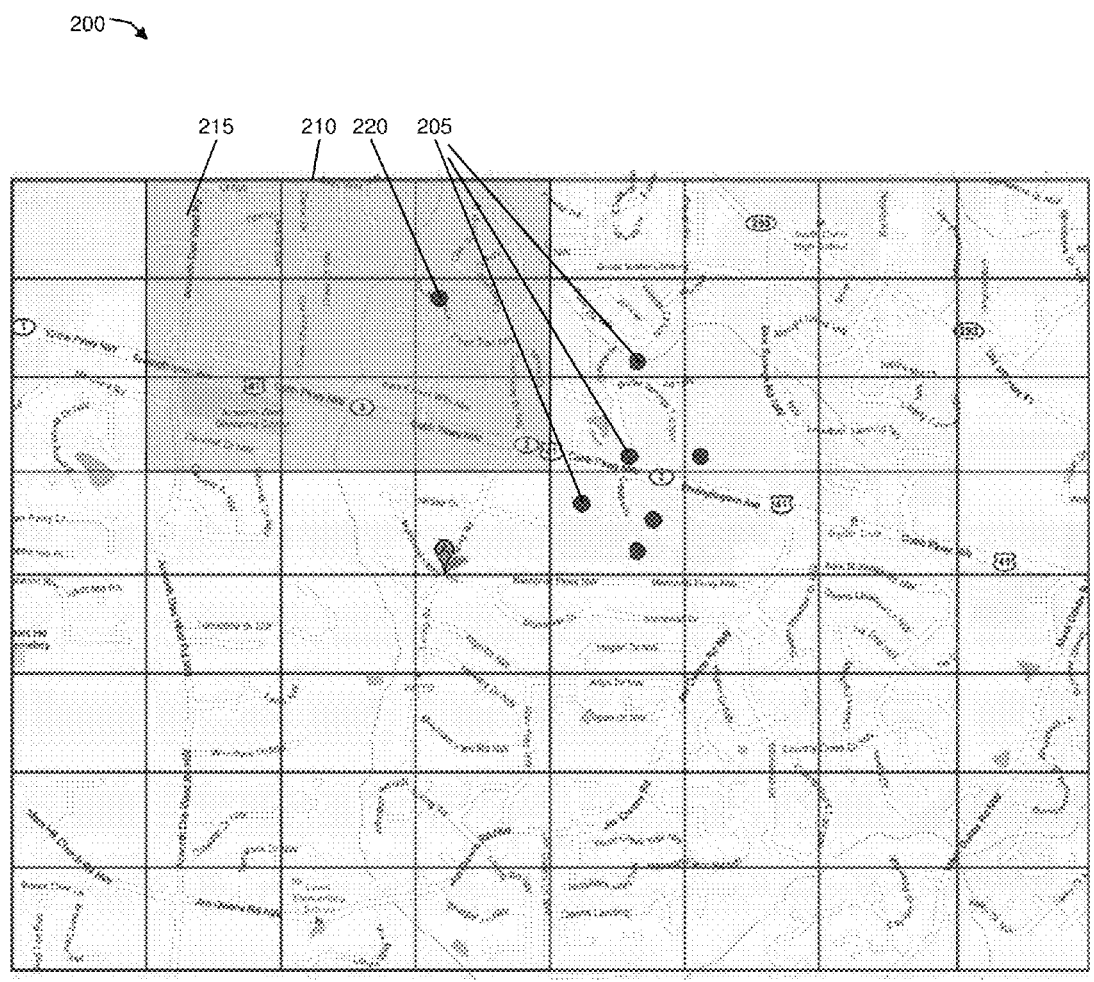
FIG. 2B is the exemplary map of FIG. 2A where an array is shifted one unit of a grid to the right in accordance with aspects of the invention.

FIG. 2B shows the exemplary map 200 where the array 215 is shifted one unit of the grid 210 to the right. The geographic center agent 115 determines again if there are at least a predetermined number of photographs taken within the array 215 to constitute a cluster of photographs. In this example, there is only one photograph 220 taken within the array 215, and that is below the predetermined number of photographs required to constitute a cluster of photographs. The agent 115 continues to search for a cluster of photographs by shifting the array 215 to the right until it reaches the rightmost end of the grid 210 or a cluster of photographs is found. If the agent 115 reaches the rightmost end of the grid 210, the agent 115 shifts the array back to the leftmost end of the grid 210 but down a unit of the grid 210, and continues the search for a cluster of photographs. The array 215 may be shifted in other directions and in units more less than one unit of the grid 210.

Figure 2C:
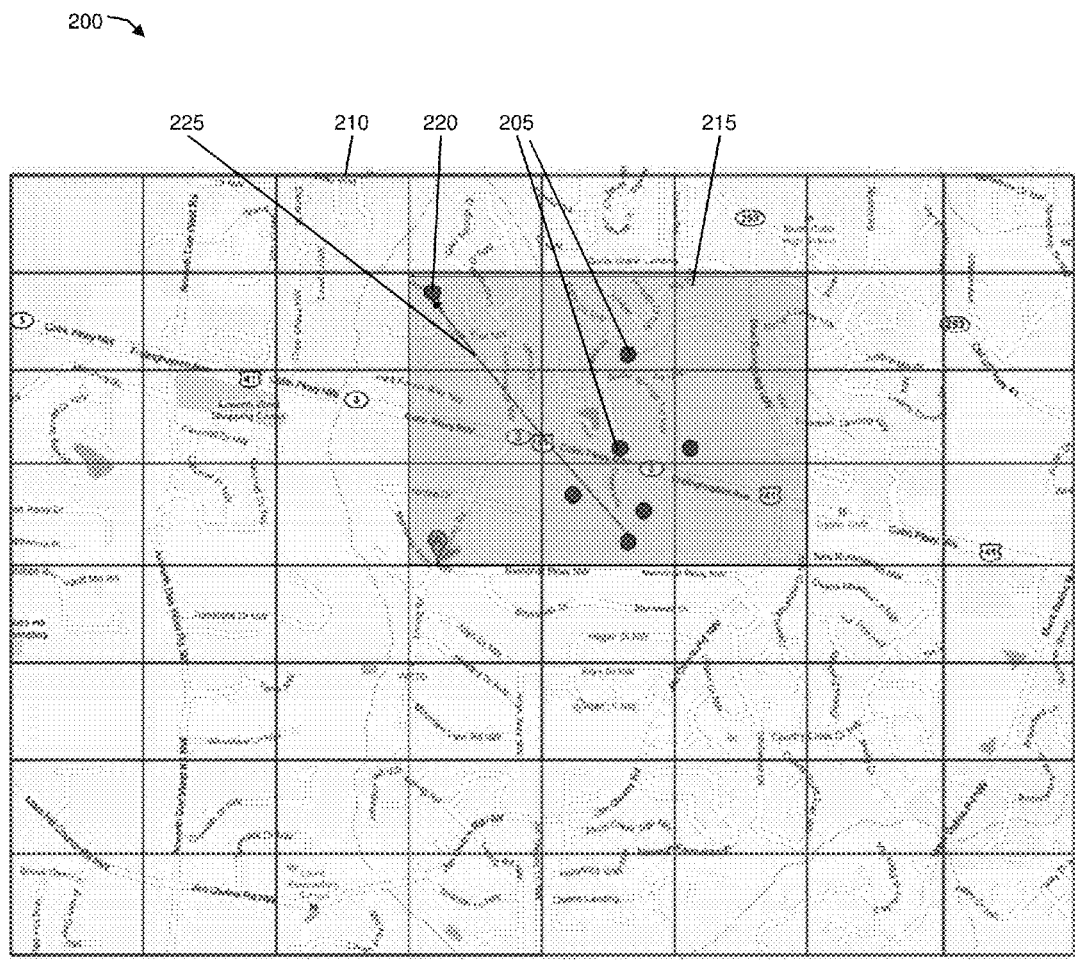
FIG. 2C is the exemplary map of FIG. 2A where the array is shifted to include a cluster photographs in accordance with aspects of the invention.

FIG. 2C shows the exemplary map 200 where the array 215 is shifted to include the cluster of the photographs 205. That is, the geographic center agent 115 determines that there are at least a predetermined number of photographs taken within the array 215 to constitute a cluster of photographs. In embodiments, the geographic center agent 115 may determine distances between the photographs 205, such as a distance 225, to discern whether any of the photographs is outside the cluster of the photographs 205. In this example, the agent 115 determines that the photograph 220 is outside the cluster of the photographs 205 since the distance 225 is greater than a predetermined distance between photographs for a cluster of photographs.

Figure 2D:
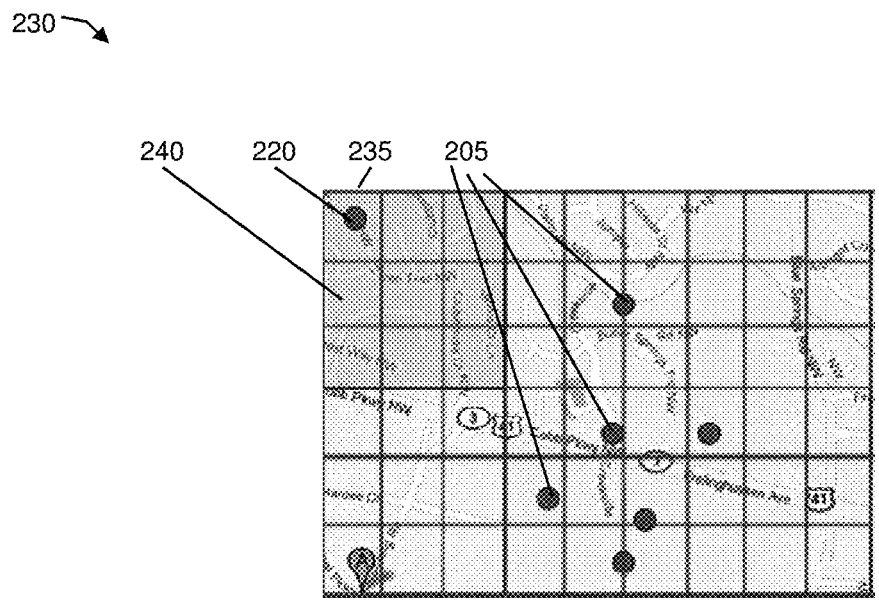
FIG. 2D is an exemplary map where a smaller grid and array are placed on the map to find a cluster of photographs in accordance with aspects of the invention.

FIG. 2D shows an exemplary map 230 where a smaller grid 235 is placed where the array 215 was last placed once the cluster of the photographs 205 is found. To further ensure that the photographs 205, 220 are within a given area, the geographic center agent 115 may perform a more granulated search of the smaller grid 235 to find a new cluster of photographs. The agent 115 also may utilize a smaller array 240 and searches the area within the array 240 to find the new cluster of photographs.

Once the geographic center agent 115 determines that there are at least a predetermined number of photographs taken within an array to constitute a cluster of photographs, the agent 115 can use locations of the photographs to determine: 1) a non-weighted geographic center and/or 2) a weighted geographic center. These geographic centers are center points or locations of a cluster of photographs.

Figure 2E:
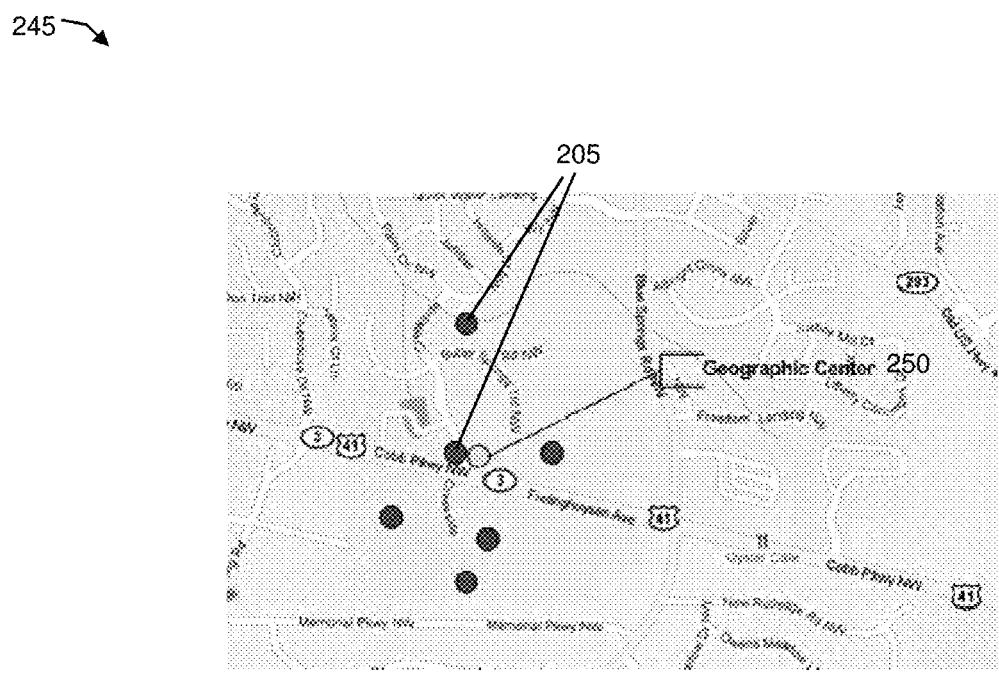
FIG. 2E is an exemplary map including a cluster of the photographs and a geographic center of the cluster in accordance with aspects of the invention.

FIG. 2E shows an exemplary map 245 including the cluster of the photographs 205 and a geographic center 250 of the cluster of the photographs 205. The geographic center agent 115 determines the geographic center 250 by placing the locations of the photographs 205 into great circle equations including trigonometric functions as described herein. The geographic center 250 may be non-weighted or weighted.

To determine a non-weighted geographic center, or a true center, of a cluster of photographs, the geographic center agent 115 uses equations that average the x-axis, the y-axis, and the z-axis values (i.e., Cartesian coordinates) of locations of the photographs (originally in latitude and longitude) to determine midpoint values for each axis. The equations for these midpoint values $x_c$, $y_c$, and $z_c$ for the corresponding x-axis, the y-axis, and z-axis include the following:

$$x_c = \left(\sum_{x=1}^{n} \cos(\text{lat}_x) * \cos(\text{lon}_x)\right)/n, \quad (1)$$

$$y_c = \left(\sum_{y=1}^{n} \cos(\text{lat}_y) * \sin(\text{lon}_y)\right)/n, \text{ and} \quad (2)$$

$$z_c = \left(\sum_{z=1}^{n} \sin(\text{lat}_z)\right)/n, \quad (3)$$

where n is a number of photographs.

These midpoint values ($x_c$, $y_c$, $z_c$) constitute a midpoint or center location of the cluster of photographs in Cartesian coordinates. To convert this center location of the cluster into longitude $\text{long}_c$ and latitude $\text{lat}_c$, the following equations may be used:

$$\text{lon}_c = a \tan 2(y_c, x_c), \text{ and} \quad (4)$$

$$\text{lat}_c = a \tan 2(z_c, \sqrt{x_c^2 + y_c^2}). \quad (5)$$

where longitude long, and latitude $\text{lat}_c$ may constitute the geographic center of the cluster of photographs.

To determine a weighted geographic center of a cluster of photographs, the above equations for a non-weighted geographic center can be modified by weighting or deteriorating each point or location of a photograph with weight d, which may be determined as follows:

$$d=365-(\text{days from entered}). \quad (6)$$

The days from entered equals a number of days that have passed since a photograph was entered or uploaded into the system. This weighting allows the geographic center agent 115 to give precedence to more recent photographs stored. Accordingly, weighted equations for midpoint values $x_c$, $y_c$, and $z_c$ of the cluster of photographs for the corresponding x-axis, the y-axis, and z-axis include the following:

$$x_c = \left(\sum_{x=1}^{n} \cos(\text{lat}_x * d_x) * \cos(\text{lon}_x * d_x)\right)/\sum_{x=1}^{n} d_x, \quad (7)$$

$$y_c = \left(\sum_{y=1}^{n} \cos(\text{lat}_y * d_y) * \sin(\text{lon}_y * d_y)\right)/\sum_{y=1}^{n} d_y, \text{ and} \quad (8)$$

$$z_c = \left(\sum_{z=1}^{n} \sin(\text{lat}_z * d_z)\right)/\sum_{z=1}^{n} d_z, \quad (9)$$

where n is a number of photographs.

Once these weighted midpoint values ($x_c$, $y_c$, and $z_c$) are determined, they may be converted into longitude $\text{lon}_c$ and latitude $\text{lat}_c$ using the equations (4) and (5) to obtain the weighted geographic center of the cluster of photographs.

Figure 3:
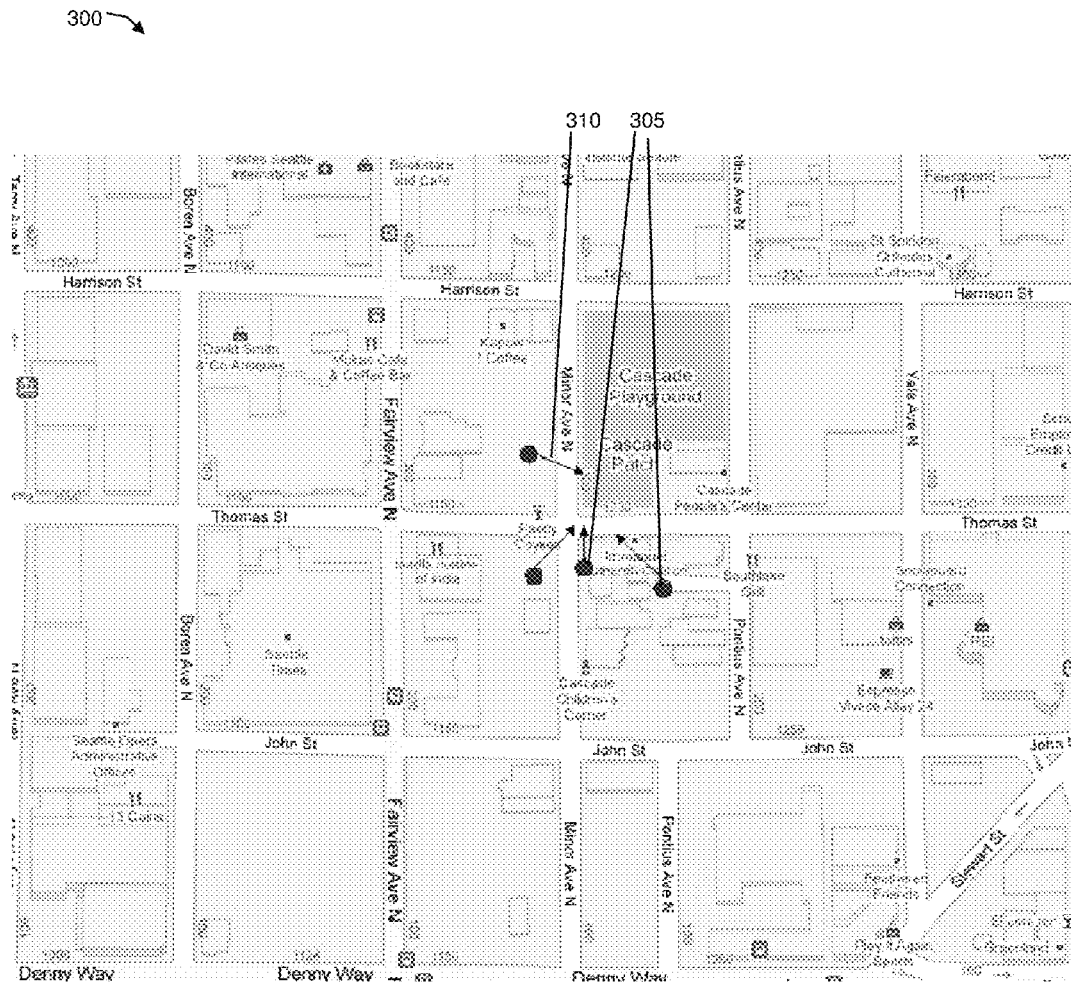
FIG. 3 is an exemplary map used to determine an azimuth-based center of a cluster of photographs in accordance with aspects of the invention.

FIG. 3 shows an exemplary map 300 used by the azimuth-based center agent 120 to determine an azimuth-based center of a cluster of photographs 305. The azimuth-based center agent 120 uses directional data 310 of devices that captured the photographs 305 to determine the azimuth-based center of the cluster of the photographs 305. As discussed above, the directional data 310 may be tagged in the photographs 305 as metadata and may be represented as directional vectors on the map 300 as shown. The azimuth-based center agent 120 may determine an intersection of the directional data 310 and may then determine that the location of this intersection is the azimuth-based center of the cluster of the photographs 305. For example, as shown in the map 300, the intersection of the directional data 310 may be the location of the "Cascade Patch," which the azimuth-based center agent 120 may set as the azimuth-based center of the cluster of the photographs 305.

In embodiments, the azimuth-based center agent 120 may use the same process as the geographic center agent 115 to find a cluster of photographs on a map before determining an azimuth-based center of the cluster. In addition, the arbiter module 105 may receive the geographic center and the azimuth-based center from the respective agents 115 and 120 and determine a hybrid center based on the geographic center and the azimuth-based center.

Flow Diagrams

FIGS. 4A-4B and 5-6 show an exemplary flow 400, an exemplary flow 415, an exemplary flow 500, and an exemplary flow 600, respectively, for performing aspects of the present invention. The steps of FIGS. 4A-4B and 5-6 may be implemented in the environment of FIG. 1, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 4A:
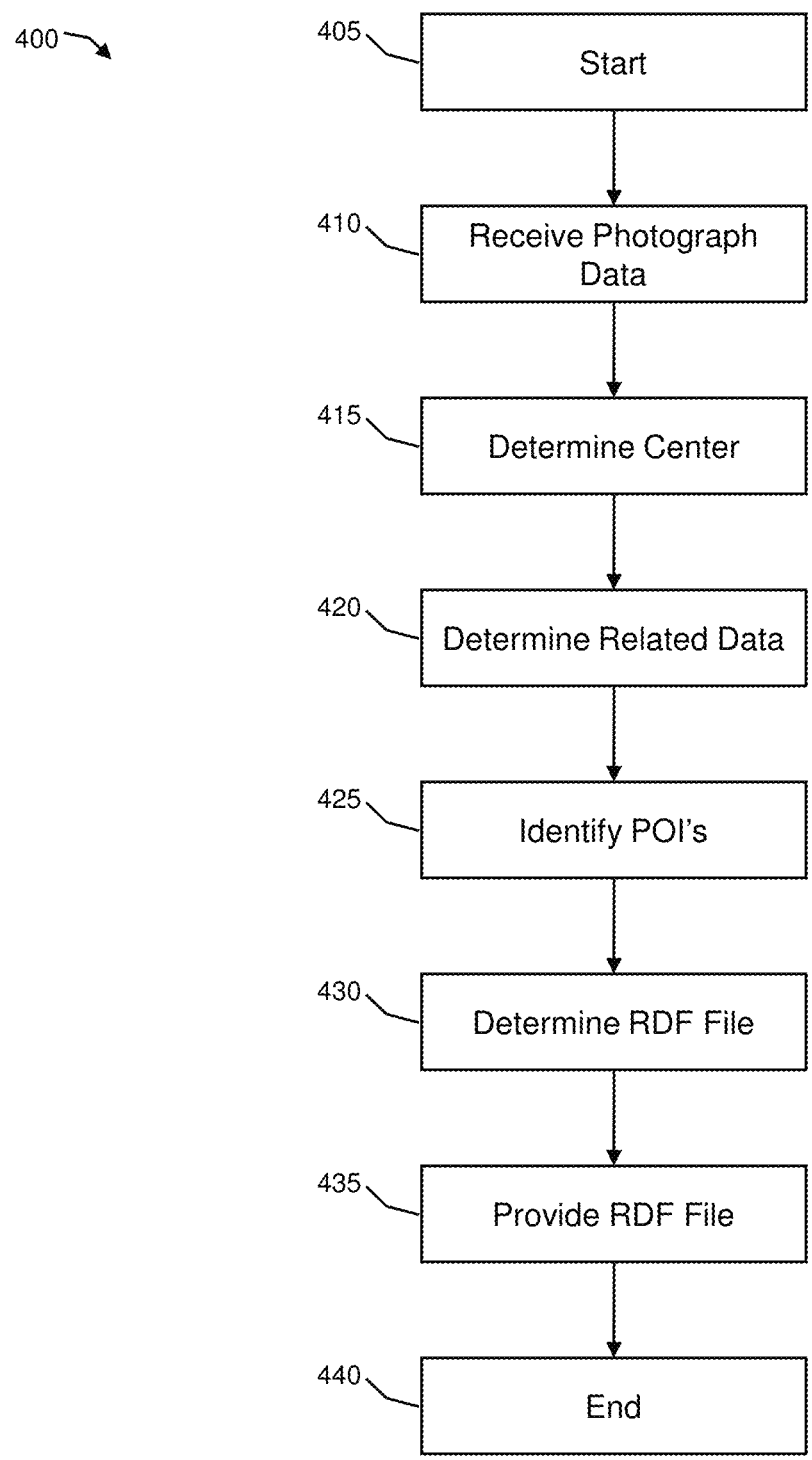
FIG. 4A shows an exemplary flow in accordance with aspects of the invention.

FIG. 4A depicts the exemplary flow 400 for a process in accordance with aspects of the present invention. At step 405, the process of the invention starts. At step 410, photograph data including metadata such as location, direction, time, and/or date of at least one photograph is received by an arbiter module. The photograph data may be received for at least one user and may be received via a photograph agent.

At step 415, a center of a cluster of photographs may be determined based on the received photograph data, by a geographic center agent and/or an azimuth-based center agent. The center may be a geographic center and/or an azimuth-based center and may be determined by respective processing agents. At step 420, data related to the photograph data may be determined, by a semantic data agent and/or a current POI's agent. The related data may include semantic data pertaining to descriptions, events, and other data for locations of the photograph data. The related data may further include current POI's at, near, and/or within a circle area around a center of locations of the photograph data. The related data may be received from at least one user or server and may be determined via corresponding processing agents.

At step 425, POI's related to the photograph data are identified based on the various data received at an arbiter module, such as the photograph data, the geographic or azimuth-based center, and/or the related data including the semantic data and/or the current POI's. At step 430, a RDF file is determined for the photograph data, by the arbiter module. For example, the RDF file may be determined for each photograph taken and may include data that is determined by the arbiter module to be related to the respective photograph. The RDF file may include location of the photograph, and may include an identified point of interest at or near the location of the photograph. The RDF file may also include a description of the identified point of interest determined or inferred to be related to the point of interest. Further, the RDF file may include event information or other information determined or inferred to be related to the point of interest.

At step 435, the RDF file is provided to a user device, another computing device, and/or a server, and may be used to present information related to a photograph to a user via, for example, an application interface. Alternatively, the RDF file may be used to tag photograph data and/or photographs with additional related information. At step 440, the process of the invention ends.

Figure 4B:
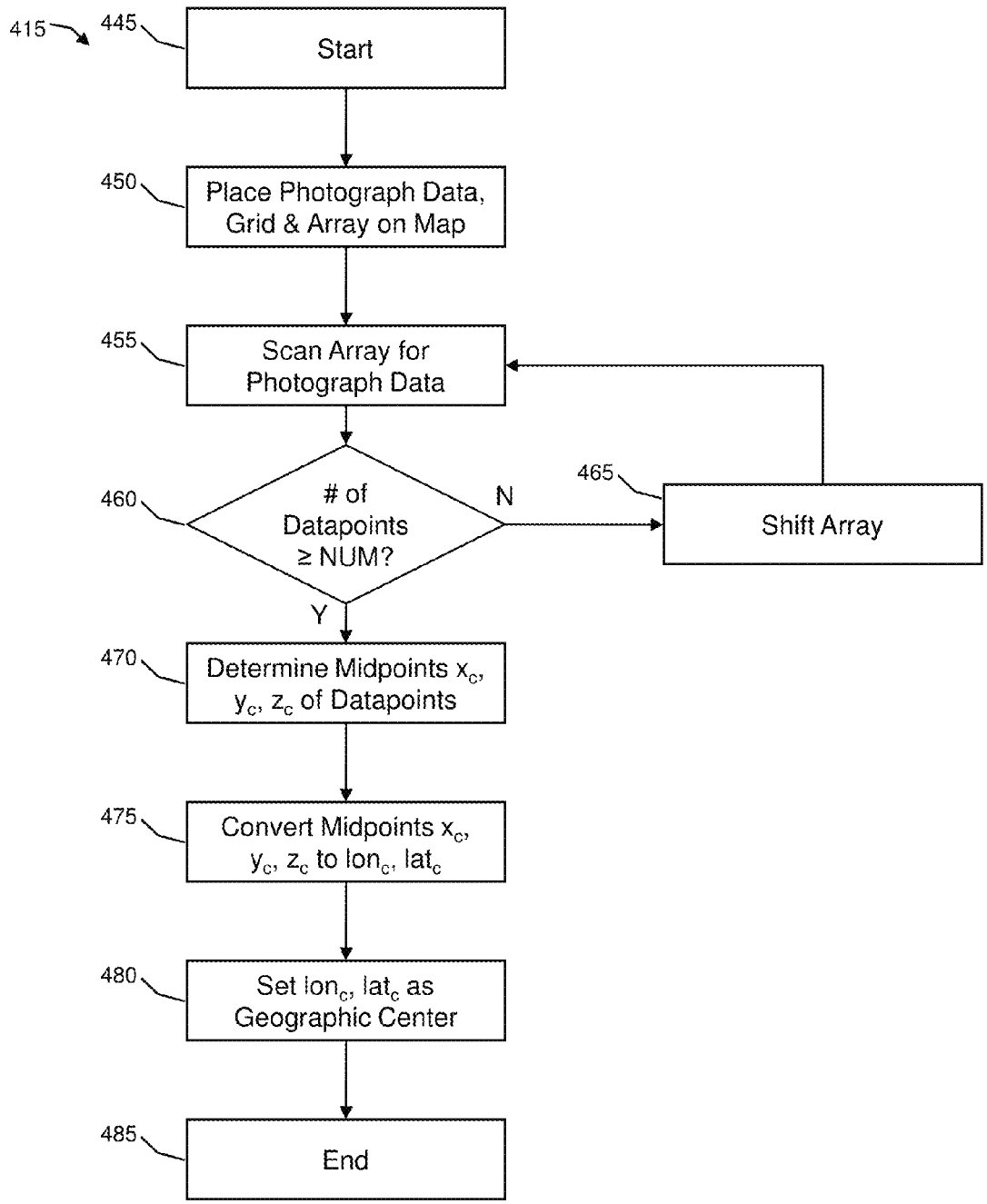
FIG. 4B shows an exemplary flow implementing processes for determining a geographic center in accordance with aspects of the invention.

FIG. 4B shows the exemplary flow 415 for a process to determine a center of a cluster of photographs in accordance with aspects of the present invention. This process may be performed by a geographic center agent. At step 445, the process of the invention begins. At step 450, photograph data (specifically datapoints), a grid, and an array are placed on a map.

At step 455, the array is scanned for the photograph location points. At step 460, it is determined whether a number of the photograph datapoints is greater than or equal to NUM, or a predetermined number of photograph location points that constitute a cluster of photographs. If the number of the photograph location points is less than NUM, then the process goes to step 465, where the array is shifted to, for example, one unit of the grid to the right. The process then returns to step 455.

If the number of the photograph location points is greater than or equal to NUM, then the process goes to step 470, where midpoints $x_c$, $y_c$, and $z_c$ are determined for the photograph location points determined to be a cluster of photographs. At step 475, the midpoints $x_c$, $y_c$, and $z_c$ are converted from Cartesian coordinates to longitude $lon_c$ and latitude $lat_c$. At step 480, the longitude $lon_c$ and latitude $lat_c$ are set as a geographic center of the cluster of photographs. At step 485, the process of determining the geographic center ends.

Figure 5:
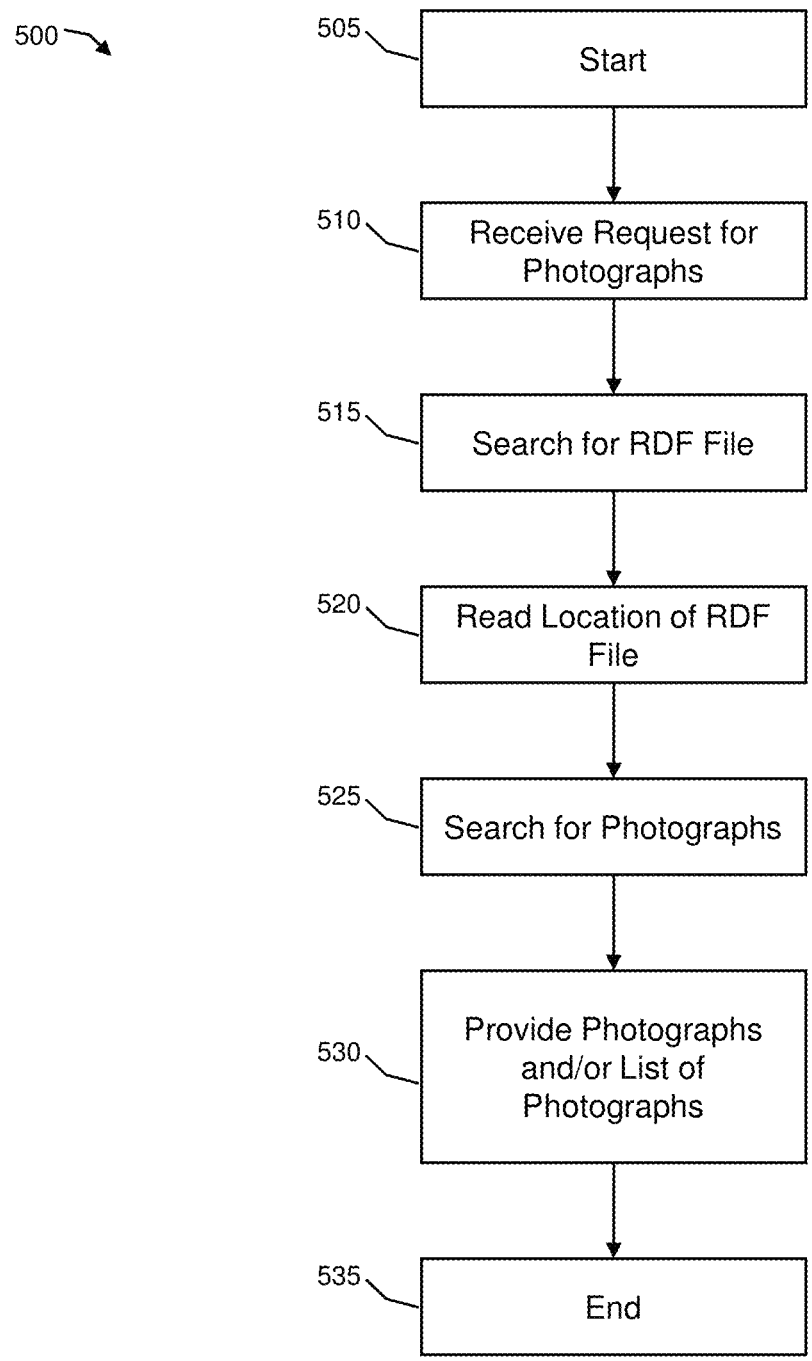
FIG. 5 shows an exemplary flow implementing processes for providing a user requested media and/or a list of requested media.

FIG. 5 shows the exemplary flow 500 for a process to provide a user requested media and/or a list of requested media. At step 505, the process starts. At step 510, a request for photographs of a point of interest on a specific date (e.g., the Monument A on the Fourth of July) is received at a photograph agent and/or an arbiter module. At step 515, the arbiter module searches RDF files stored in the system to retrieve a RDF file including semantic data with the requested point of interest on the specific date. At step 520, the arbiter module reads a location from the retrieved RDF file. At step 525, the arbiter module searches for photographs and/or photograph data within the read location, the photographs being stored locally or externally. At step 530, the arbiter module provides the user any photographs within the read location and/or a list of such photographs via the photograph agent and/or the network. At step 535, the process of providing a user requested media and/or a list of requested media ends.

Figure 6:
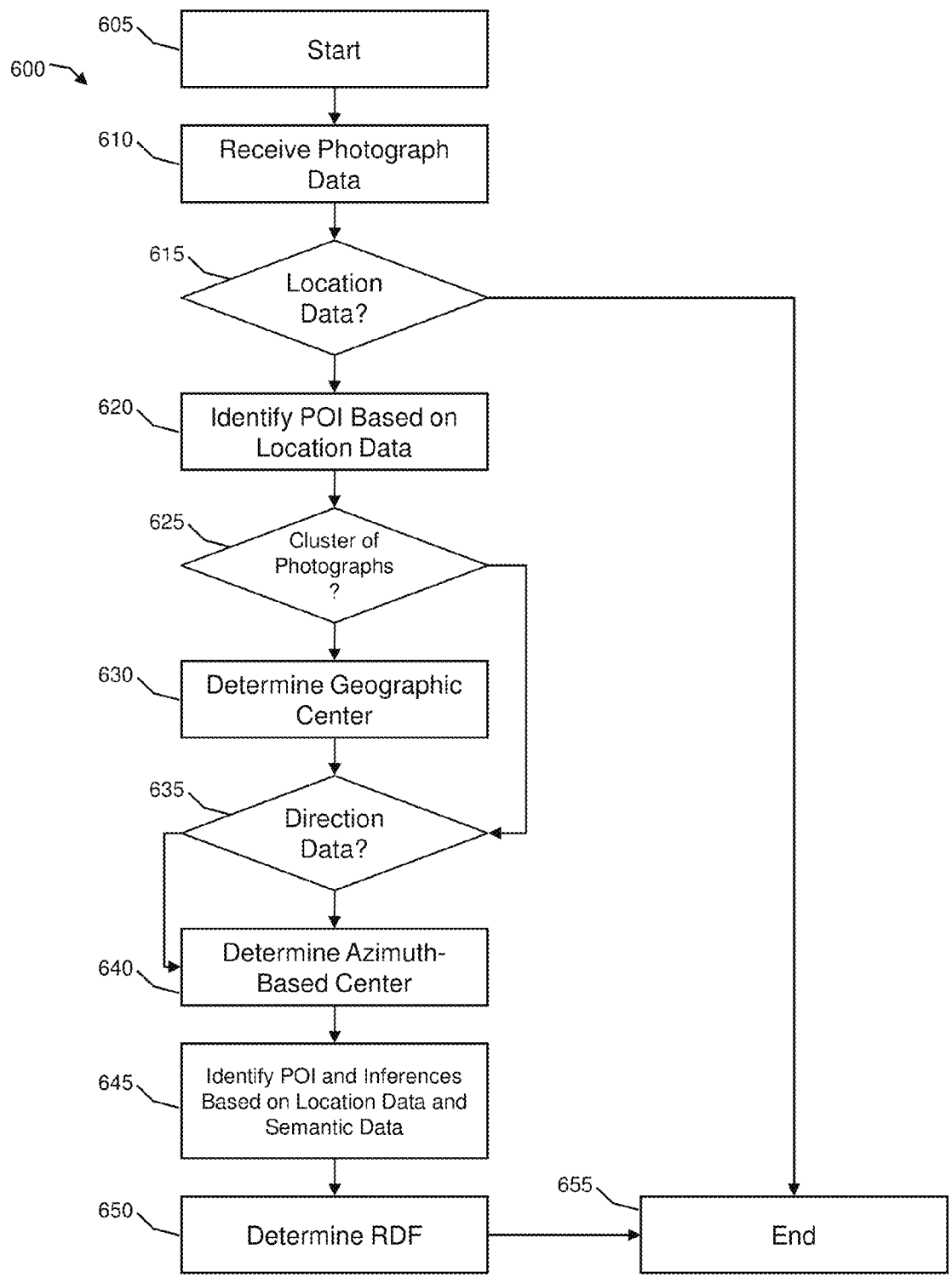
FIG. 6 shows another exemplary flow in accordance with aspects of the invention.

FIG. 6 shows the exemplary flow 600 for another process in accordance with aspects of the present invention. At step 605, the process starts. At step 610, photograph data including metadata such as location, direction, time, and/or date of at least one photograph is received by the system of the present invention. The photograph data may be received for at least one user and may be received via a photograph agent.

At step 615, the arbiter module determines whether there is location data in the received photograph data. If there is location data in the photograph data, then the process continues at step 620. If there is no location data in the photograph data, then the process ends at step 655. At step 620, the arbiter module identifies at least one point of interest based on the received location data. That is, the arbiter module determines whether the location data of at least one photograph is near current points of interest that may be received from a current points of interest agent.

At step 625, a geographic center agent determines whether there is a cluster of photographs in a given area based on the received photograph data and possibly stored photograph data. If there is a cluster of photographs, then the process continues at step 630. If there is not a cluster of photographs, then the process continues at step 635. At step 630, the geographic center agent determines a geographic center and/or a weighted geographic center based on the cluster of the photographs.

At step 635, an azimuth-based center agent determines whether there is direction data in the received photograph data. If there is direction data in the photograph data, then the process continues at step 640. If there is no direction data in the photograph data, then the process continues at step 645. At step 640, the azimuth-based center agent determines an azimuth-based center based on the received direction data.

At step 645, the arbiter module identifies the at least one point of interest and inferences (e.g., potential events) based on the received location data and/or semantic data, which may include the determined geographic center, the determined azimuth-based center, the current points of interest, and other semantic data received from various processing agents in the system. Specifically, the arbiter module compares the received location data and the semantic data to determine whether the at least one point of interest and/or the inferences can be inferred. At step 650, the arbiter module determines a RDF file that includes the photograph data, the at least one point of interest and the inferences, which may be used to represent or describe a photograph. At step 655, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method comprising:
   receiving, by a computer processor, media data comprising location data that includes where a plurality of media was captured;
   receiving semantic data comprising at least one of a description and an event for the location data of the plurality of media; and
   determining, by the computer processor, a center of a cluster of the plurality of media based on the location data and direction data comprising a direction a device was pointing to capture the plurality of media;
   wherein the determining the center of the cluster of the plurality of media comprises:
      determining a geographic center of the plurality of media using an average midpoint of the location data associated with the plurality of media;
      determining an azimuth-based center of the plurality of media using an intersection of the direction data associated with the plurality of media; and
      determining a hybrid center as the center of the cluster of the plurality of media using the geographic center and the azimuth-based center,
   wherein the determined hybrid center is associated with the semantic data.

2. The method of claim 1, further comprising determining at least one point of interest using the media data, the center of the cluster of the plurality of the media, and the semantic data.

3. The method of claim 2, wherein the determining of the at least one point of interest using the geographic center comprises:
plotting a predetermined area around the geographic center; and
determining whether at least one current point of interest falls within the predetermined area.

4. The method of claim 2, wherein the determining of the at least one point of interest comprises determining the semantic data using the media data.

5. The method of claim 2, wherein the determining of the at least one point of interest comprises:
determining at least one current point of interest based on the media data; and
determining the at least one point of interest using the at least one current point of interest.

6. The method of claim 2, further comprising tying the media data to the semantic data related to the at least one point of interest,
wherein the tying the media data to the semantic data comprises:
determining a level of confidence that the media data is related to the semantic data; and
inferring the media data is related to the semantic data if the level of confidence is greater than or equal to a predetermined threshold.

7. The method of claim 2, further comprising:
tying the media data to the at least one point of interest; and
providing the media data tied to the at least one point of interest to an end user.

8. The method of claim 7, wherein the tying the media data to the at least one point of interest comprises tagging the plurality of media with the at least one point of interest.

9. The method of claim 1, further comprising determining at least one point of interest using shared media tagged with geographical identification metadata, and automatically tying the media data to the at least one point of interest.

10. The method of claim 9, wherein the at least one point of interest is correlated with the location data comprising a longitude and a latitude to retrieve the semantic data of the at least one point of interest.

11. The method of claim 10, wherein the semantic data comprises a name and a description of the at least one point of interest.

12. A system implemented in hardware, comprising:
a media agent configured to receive media data comprising location data of where a plurality of media was captured and direction data comprising a direction a device was pointing to capture the plurality of media;
a semantic data agent configured to determine semantic data based on the plurality of media, the semantic data comprising at least one of a description and an event for the location data of the plurality of media; and
a center agent configured to determine a center of a cluster of the plurality of the media,
wherein the center agent is configured to:
determine a geographic center of the cluster of the plurality of the media using an average midpoint of the location data associated with the plurality of media;
determine an azimuth-based center of the cluster of the plurality of the media using an intersection of the direction data associated with the plurality of media; and
determine a hybrid center as the center of the cluster of the media using the geographic center and the azimuth-based center, and
wherein the determined hybrid center is associated with the semantic data.

13. The system of claim 12, further comprising an arbiter module configured to:
receive the media data from the media agent;
receive the center of the cluster of the plurality of media from the center agent;
receive the semantic data from the semantic data agent;
determine at least one point of interest using the media data, the center of the cluster of the plurality of media, and the semantic data;
tie the media data to the at least one point of interest;
receive from an end user a request for the media related to the at least one point of interest; and
provide the end user at least one of another media and another media data tied to the at least one point of interest.

14. The system of claim 12, further comprising the media agent configured to determine at least one point of interest using shared media tagged with geographical identification metadata, and automatically tie the media data to the at least one point of interest.

15. The system of claim 14, wherein the at least one point of interest is correlated with the location data comprising a longitude and a latitude to retrieve the semantic data of the at least one point of interest.

16. The system of claim 15, wherein the semantic data comprises a name and description of the at least one point of interest.

* * * * *